United States Patent [19]

Borase et al.

[11] Patent Number: 4,587,068
[45] Date of Patent: May 6, 1986

[54] METHOD OF MAKING CERAMIC TAPES

[75] Inventors: Vijay Borase, Wayne, N.J.; James F. Smith, Monroe; Efraim Sagiv, Chester, both of N.Y.

[73] Assignee: Materials Research Corporation, Orangeburg, N.Y.

[21] Appl. No.: 507,572

[22] Filed: Jun. 24, 1983

[51] Int. Cl.⁴ ............................................. C04B 35/64
[52] U.S. Cl. ........................................ 264/63; 264/86; 524/779; 524/786
[58] Field of Search ............... 264/63, 86, 175, 67; 524/779, 786, 864, 780, 783, 785, 787

[56] References Cited

U.S. PATENT DOCUMENTS

| | | | |
|---|---|---|---|
| 2,853,461 | 9/1958 | Padbury et al. | 260/41 |
| 2,966,719 | 1/1961 | Park, Jr. | 25/156 |
| 3,004,197 | 10/1961 | Rodriguez et al. | 317/258 |
| 3,005,244 | 10/1961 | Erdle et al. | 22/129 |
| 3,127,456 | 3/1964 | Wahl | 264/24 |
| 3,243,397 | 3/1966 | Herkimer et al. | 260/29.3 |
| 3,318,840 | 5/1967 | Weston | 260/41 |
| 3,471,435 | 10/1969 | Miller | 524/786 |
| 3,472,803 | 10/1969 | Andrews et al. | 260/17 |
| 3,518,756 | 7/1970 | Bennett et al. | 29/625 |
| 3,540,894 | 11/1970 | McIntosh | 106/39 |
| 3,592,882 | 7/1971 | Morita | 264/1 |
| 3,624,193 | 11/1971 | Sze | 264/101 |
| 3,717,487 | 2/1973 | Hurley et al. | 106/43 |
| 3,859,247 | 1/1975 | MacKenzie, Jr. | 260/42.15 |
| 3,872,197 | 3/1975 | Kato et al. | 264/40 |
| 3,891,594 | 6/1975 | Taylor | 524/779 |
| 3,953,562 | 4/1976 | Hait et al. | 264/63 |
| 3,978,178 | 8/1976 | Oshima et al. | 264/25 |
| 3,998,917 | 12/1976 | Adelman | 264/63 |
| 4,089,918 | 5/1978 | Kato | 264/40.7 |
| 4,217,320 | 8/1980 | Ezis et al. | 264/86 |
| 4,353,958 | 10/1982 | Kita | 264/63 |
| 4,401,776 | 8/1983 | Munk | 524/779 |

OTHER PUBLICATIONS

Meiser, "Effects of Temperature, Density and Flocculants on the Strength of Mineral-Wood/Clay Composites", Cir. Bull., vol. 57, No. 8, (1978), pp. 731-734.

Primary Examiner—Donald Czaja
Assistant Examiner—Mary Lynn Fertig
Attorney, Agent, or Firm—Kenyon & Kenyon

[57] ABSTRACT

A method of producing ceramic items which does not necessitate the use of high vapor pressure organic solvents, aqueous solvents, binders or plasticizers. A monomer is used as a vehicle for deflocculation of the ceramic powder and, after forming, is polymerized to form a matrix which binds the ceramic particles together.

16 Claims, 1 Drawing Figure

U.S. Patent
May 6, 1986
4,587,068
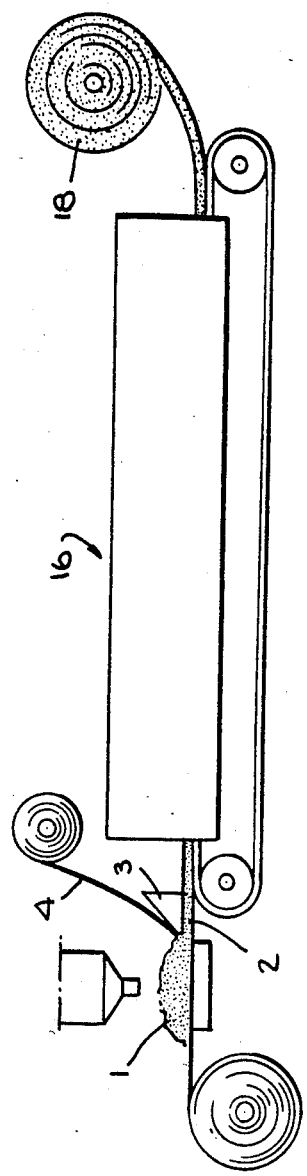

METHOD OF MAKING CERAMIC TAPES

BACKGROUND OF THE INVENTION

1. Field of the Invention

This invention relates generally to the manufacture of ceramic items and particularly to improvements in the manufacture of thin flat ceramic substrates.

2. Description of the Prior Art

The art of manufacturing thin flat ceramic items has been developed to meet the need for capacitor dielectrics and for substrates in microelectronic circuitry, among other uses. The common method for manufacturing such articles is by the tape casting process. In this process a fluid ceramic slurry, called a slip, is made by mixing together a finely ground ceramic powder, such as aluminum oxide (alumina), with suitable amounts of an organic binder, a volatile solvent, usually a plasticizer, and possibly small amounts of other materials, depending on the product requirements. Typical ingredients are identified, and the mixing and casting process are fully described in U.S. Pat. No. 2,966,719, issued to J. L. Park, Jr. on Jan. 3, 1961 as assignor to American Lava Corporation, and in U.S. Pat. No. 3,698,923, issued to H. W. Stetson, et al. on Oct. 17, 1972 as assignors to Western Electric Company, Inc. The reader is referred to these patents and also to the earlier U.S. Pat. No. 2,585,993, issued to G. N. Howatt on Jan. 22, 1952, for details of the tape casting process and its developmental history as well as for the characteristics of the resulting ceramic product.

Briefly, the process involves discharging the above described ceramic slip, which has a viscosity and consistency approximately the same as heavy cream, from a reservoir onto a supported, moving surface, preferably a plastic tape or film such as cellulose acetate, polytetrafluoroethylene ("Teflon"), or glycol terephthalic acid ester ("Mylar"). The film is usually in the form of an elongated strip several hundred feet long and from ½ to 2 feet wide, wound on a storage reel mounted next to the reservoir.

The tape is fed from the storage reel under the reservoir to a takeup reel, and a suitable drive mechanism moves the tape in a substantially horizontal path from the storage reel to the takeup reel. The cast slip is distributed evenly on the moving tape by an inverted dam forming the outlet of the reservoir or by a doctor blade in order to form a layer of uniform and controlled thickness.

As the layer of cast slip is conveyed on the plastic tape from the reservoir, the volatile solvents evaporate, the process of driving off the solvents being accelerated by passing the tape through an elongated, heated drying chamber. The resulting product is a ceramic tape that is aptly described as "leather hard." This tape can be punched or sliced into the shape and size desired for the substrate or other item and then be fired at high temperature (e.g. 1500° C.) to produce a rigid ceramic article.

The high vapor pressure solvents used in the conventional process for producing ceramic articles are generally toxic, may be flammable and have low flash points, thus creating a health hazard and environmental problems and necessitating reclamation of the solvent evaporated from the slip during drying. In addition, when the solvent is evaporated by heating, shrinkage and binder migration occur making it difficult to control the thickness of the product and causing stresses to develop in the green ceramic product. The stresses cause deformation of e.g., a tape into a curved surface with a saddle shape cross-section and are frequently sufficiently severe to cause cracking.

The critical factor limiting the production speed of dried, "green" ceramic tape (i.e. leather hard tape) is the rate of evaporation of solvents from the slip. Long drying times are necessary to remove the organic solvents due to skin drying and the high liquid to solid ratio. As a result, control of the thickness profile during casting is difficult, and only limited thicknesses can be attained. In addition, the slip is highly sensitive to air flow and heat distribution while drying, which leads to flow lines, surface defects and thickness variations.

It is a primary object of the present invention to provide a method of making ceramic items which permits a more rapid rate of production and reduces the stresses and deformations in the "green" ceramic material which occur due to the evaporation of solvents from the slip during curing.

A further object of the present invention is to provide a method of making ceramic items which eliminates the need for high vapor pressure organic solvents and the safety and environmental problems associated with their evaporation and reclamation.

A still further object of the present invention is to provide a method of making ceramic items which provides improved control over the thickness of the ceramic items.

Another object of the present invention is to provide a method of making ceramic items in which the articles can be formed by a variety of methods, including casting, extrusion, and molding.

Yet another object of the present invention is to provide a method of making ceramic items in which both sides of the item may be protected by a carrier surface during curing.

SUMMARY OF THE INVENTION

These and other objects of the invention are achieved by replacing the solvent, binders and plasticizers in the slip with one or more organic monomers having low viscosity and low vapor pressure. The monomer functions as a vehicle for deflocculation of the ceramic powder, thus obviating the need for traditional high vapor pressure and aqueous solvents and eliminating the dangers and production difficulties encountered with the use of such solvents. In one embodiment, deflocculation of the ceramic powder is enhanced by adding additional organic medium containing monomer and an amount of defloculent sufficient to maintain the level of defloculent in the slip desired for forming. This excess organic medium is removed prior to forming the slip by casting, extrusion, or molding.

After forming, the monomer is polymerized, preferably by heating or by irradiation, to form a matrix which binds the ceramic particles, thus obviating the need for curing by solvent evaporation, as well as the need for separate binders and plasticizers.

BRIEF DESCRIPTION OF THE DRAWING

The FIGURE is a schematic side view representation of a forming system incorporating the use of a second carrier film.

DETAILED DESCRIPTION OF THE INVENTION

A mixture of a ceramic powder such as alumina, one or more monomers and one or more deflocculents is prepared by any of the means well-known in the art of producing ceramic articles, such as by milling in a ball mill. The monomers which may be used comprise anhydrides and mono-, di- and higher esters of unsaturated carboxylic acids. Preferred monomers comprise anhydrides and esters of acrylic acid, methacrylic acid, maleic acid, fumaric acid, itaconic acid and citraconic acid.

Preferred di- and higher esters include esters of ethylene glycol, 1,2- and 1,3-propylene glycol, 1,3- and 1,4-butylene glycol, diethylene glycol, triethylene glycol, tetraethylene glycol, glycerol, 1,4-butenediol, 1,6-hexanediol, 1,10-decanediol, 2,2-dimethyl-propanediol, dipropylene glycol, Bisphenol A (4,4'-isopropylidenediphenol), ethoxylated Bisphenol A, propoxylated Bisphenol A, trimethylolpropane, pentaerythritol, polyethylene glycol, neopentyl glycol as well as hydroxyl-terminated polyesters, polyurethanes, polybutadiene or butadiene copolymers and hydroxyl-containing acrylic or epoxy resins.

The alkyl or aryl moiety in the mono-esters may contain from one to about 40 or more carbon atoms and may be saturated, unsaturated, substituted or unsubstituted. Examples include methyl, ethyl, n-propyl, isopropyl, n-butyl, isobutyl, sec-butyl, tert-butyl, n-amyl, iso-amyl, t-amyl n-hexyl, isohexyl, n-octyl, isooctyl, n-decyl, isodecyl undecyl, dodecyl, tridecyl, hexadecyl, oleyl, stearyl, cyclohexyl, 3,3,5-trimethylcyclohexyl, bornyl, isobornyl, 2-methoxyethyl, 2-ethoxyethyl, 2-butoxyethyl, ethoxyethoxyethyl, dimethylaminoethyl, t-butylaminoethyl, benzyl, phenyl, hydroxyethyl, hydroxypropyl, hydroxybutyl, furfuryl, tetrahydrofurfuryl, glyceryl, phenylethyl, phenoxyethyl, glycidyl, 2-hydroxymethyl-5-norbornenyl, hexafluoroisopropyl, crotyl, allyl, methallyl, dicyclopentadienyloxyethyl and the like.

The particular monomer or monomers to be used and the percentages of each are readily determined by experimentation by one skilled in the art to obtain the desired degree of hardness and plasticity for further processing for the intended use of the finished product.

Suitable deflocculents include fish oil, nonionic surfactants such as ethylene oxide condensates of alcohols, phenols, amines, amides, carboxylic acids and the like, and ionic surfactants such as quaternary ammonium compounds as well as carboxylic acids such as oleic acid, stearic acid, caprylic acid, methacrylic acid and the like. A grain growth inhibitor, such as a magnesium compound, should also preferably be added to slips containing alumina.

In one embodiment, deflocculation of the ceramic powder is enhanced by adding larger quantities of the monomer to reduce the viscosity of the slip. The excess monomer which is added to improve deflocculation results in a slip that is not sufficiently viscous for casting and which, after casting and curing, will contain too much polymer for effective sintering. This excess monomer is removed by means of electrophoretic separation, by filter pressing or any other appropriate method to concentrate the slip to approximately 10 to 20% organic content by weight. An additional quantity of defocculent may also be added to the slip to further enhance deflocculation and to maintain the proportion of deflocculent in the slip after the concentration process at the desired level. Since most methods for concentrating the slip remove most deflocculents and monomers in approximately the same ratio as is present in the original slip composition, the addition of excess monomer and deflocculent can be accomplished by adding an additional quantity of organic medium comprising monomer and deflocculent in the desired ratio.

If the monomers present in the slip do not include a cross-linking agent, a cross-linking monomer should be added. The addition of a cross-linking agent at this time rather than prior to milling is preferred when earlier addition of the cross-linking agent might result in premature polymerization due to the characteristics of the particular cross-linking agent selected.

Polymerization may be carried out using electron beam radiation or gamma or ultraviolet radiation. If ultraviolet radiation is to be used, a photosensitizer and an activator should be added in accordance with general practices well known in the art.

Alternatively, the polymerization may be carried out thermally using a chemical catalyst. Catalysts which may be used include free radical precursors such as azo and peroxygen compounds, e.g. acyl peroxides, dialkyl peroxides, peroxyesters, and hydroperoxides.

A plasticizer of the type well known in the art may also be added if desired. In addition, viscosity builders of the type well known in the art may be added to control the final rheology of the slip for the intended forming method, e.g. extrusion, casting or molding. After de-gassing, the slip is ready for forming.

The slip may be formed by any conventional process such as casting, extrusion, or molding. Since there is no solvent present which must be evaporated during curing, the slip should be formed between two layers of carrier surface. The second carrier film, in addition to improving the characteristics of the final product as discussed below, minimizes the extent to which the slip reacts with ambient oxygen. Although polyester carriers are preferred, the carrier film may be made of Teflon (polytetrafluoroethylene), poly(ethylene terephthalate), stainless steel, or any other material with a smooth surface to which the cured article will not adhere.

When the slip is formed between two carrier films, extrusion-type forming is preferred. The FIGURE illustrates a system for extrusion-type forming incorporating the use of a second carrier surface. A reservoir (1) of slip is maintained above the lower carrier surface (2). As the lower carrier moves beneath the extrusion block (3), a thin film of slip is extruded onto the lower carrier and is covered by the upper carrier surface (4) which passes beneath the extrusion block.

In the preferred embodiment, polymerization is accomplished by passing the formed slip and the carrier or carriers through a heating chamber (16), which is maintained at a temperature sufficient to induce polymerization of the monomer. The polymerization may also be accomplished with electron beam, gamma, or ultraviolet radiation. Depending upon the particular monomers and method of carrying out the polymerization, the temperature may range from ambient to about 300° C., preferably between approximately 80° C. and 200° C. The length of time that is required for curing varies with the monomer system, the method of polymerization, the catalyst or initiator and the temperature of the heating chamber. Since there is no large amount of solvent to be removed during the curing step, extensive air circulation in the heating chamber is unnecessary and no solvent reclamation system need be attached to the chamber.

When the green material and carrier emerge from the tunnel, they may be either rolled onto a take-up reel (18) or cut into segments if desirable for further processing. Since the slip has been cast between two carriers, both surfaces of the green ceramic material are protected, and either surface may be selected as the unmarred surface for preparing the finished ceramic articles. The carrier may be separated from the green ceramic material before cutting into the shapes desired for the final product or may be left in place until cutting has been completed.

The green ceramic material is sintered by firing in a kiln at temperatures of approximately 1200° C. to 2000° C., the time required for sintering depending on the materials used in preparing the slip and the temperature of the kiln. Temperatures of about 1400° C. to 1600° C. are preferred for alumina ceramics. Ferrites, steatites and electrical porcelains, for example, can have firing temperatures ranging from 1200° C. to greater than 2000° C.

Although deformation of the green material is minimal because no solvent has been evaporated during curing and because the shorter curing times permit less migration of the polymerized monomer than occurs with the binding and plasticizing agents used in conventional processes, some deformation of the ceramic material occurs during sintering. This warping may be corrected if necessary for the end use intended by an additional firing step.

EXAMPLE 1

A ball mill was charged with the following composition, where the amounts are given in weight percent of total:

| | |
|---|---|
| Lauryl methacrylate | 34.1 |
| Hydroxyethyl methacrylate | 5.8 |
| 1,3-Butylene glycol dimethacrylate | 1.0 |
| Triton X-102 (octylphenol-ethylene oxide adduct with 12 moles ethylene oxide) | 2.7 |
| Oleic acid | 0.2 |
| Magnesium carbonate | 0.2 |
| Magnesium sulfonate | 0.2 |
| Alumina | 55.8 |

The mixture was milled for 41 hours. The viscosity of the mixture was 50 cps after milling. The slurry containing 43.8% organic content was subjected to filtration in a filter press under 75 psi pressure. The filter cake contained 7.2% organic content. After 1.4 g of a 50% solution of tert-butyl peroctoate in mineral spirits was added per 100 grams of the slip, it was placed in a vacuum chamber and degassed for 1 hour. The slip was then cast onto a moving sheet of poly(ethylene terephthalate) and covered by a second sheet of poly(ethylene terephthalate). The sandwich structure containing the slip between two carrier films was carried through a heating chamber maintained at a temperature of about 95° C. with a residence time of 10 to 15 minutes.

EXAMPLE 2

A ball mill was charged with the following composition, where the amounts are given in weight percent:

| | |
|---|---|
| Tetrahydrofurfuryl methacrylate | 16.3 |
| Isodecyl methacrylate | 16.3 |
| Tetraethylene glycol dimethacrylate | 0.5 |
| Triton X-102 | 2.0 |
| Methacrylic acid | 0.5 |
| Magnesium methacrylate | 0.3 |
| Caprylic acid | 0.3 |
| Alumina | 63.9 |

After the mixture was milled for 4 hours the viscosity was 58 cps. The mixture containing 36.1% organic content was subjected to electrophoretic separation. The resultant concentrate had a viscosity of 7000 cps. 0.4 g of t-butyl peroctoate was added for each 100 g of slip, and the slip was de-aired for 1 hour. The slip was cast onto polyester film, as described in the previous example, and cured at 129° C. with a residence time of 10–15 minutes.

EXAMPLE 3

The following ingredients were ball-milled for 48 hours (amounts in weight percent):

| | |
|---|---|
| Lauryl methacrylate | 31.0 |
| 1,3-Butylene glycol dimethacrylate | 6.9 |
| Triton X-102 | 4.0 |
| Caprylic acid | 0.3 |
| Magnesium sulfonate | 0.1 |
| Alumina | 57.7 |

The slurry containing 42.2% organic content was concentrated by electrophoresis. After the addition of 0.3 g of t-butyl peroctoate per 100 grams of the concentrate, the slip was degassed in vacuo for 1 hour and then cast between two sheets of poly(ethylene terephthalate). The cast slip was cured at 121° C. with a residence time of 10–15 minutes.

EXAMPLE 4

The following ingredients were charged into a ball mill (amounts in weight percent):

| | |
|---|---|
| Lauryl methacrylate | 4.3 |
| Tetrahydrofurfuryl methacrylate | 7.7 |
| Triton X-102 | 2.0 |
| Methacrylic acid | 0.9 |
| Oleic acid | 0.2 |
| Alumina | 85.1 |

After milling the mixture containing 15.0% organic content for 168 hours, the viscosity was 3500 cps. A total of 0.3% by weight of 1,3-butylene glycol dimethacrylate, and 0.5% by weight of t-butyl peroctoate was added to the slip, which was then de-aired in vacuo for 1 hour. The slip was cast onto moving polyester sheets as described in Example 1, and cured in a heating chamber at 127° C. with a residence time of 10–15 minutes.

EXAMPLE 5

A ball mill was charged with the following ingredients, where the amounts are given in weight percent of the total:

| | |
|---|---|
| Isodecyl methacrylate | 12.1 |
| Triton X-102 | 2.0 |
| Butylene glycol dimethacrylate | 0.4 |
| Magnesium sulfonate | 1.0 |
| Magnesium methacrylate | 0.4 |

| -continued | |
|---|---|
| Caprylic acid | 0.3 |
| Alumina | 83.8 |

The mixture was milled for 90 hours. The viscosity of the mixture was 1180 cps after milling.

The following solution was prepared and an amount equal to 1.1 percent by weight was added to the slip:

| Poly-isobutyl methacrylate | 35.0 percent by weight |
|---|---|
| Hydroxypropyl methacrylate | 65.0 percent by weight |

After adding 0.4 percent by weight of t-Butyl peroctoate, the slip was de-aired in vacuo, cast between two moving polyester sheets and cured in a similar manner to the above example.

What is claimed is:

1. A method of preparing ceramic tapes comprising: (1) physically mixing a slip comprising a ceramic powder, a deflocculant, and at least one monomer, in the absence of either water or an inert volatile organic solvent; (2) forming the slip on a carrier surface; and (3) polymerizing the monomer.

2. The method of claim 1 wherein the monomer is polymerized by heating.

3. The method of claim 2 wherein the slip is concentrated by removing a portion of the monomer prior to forming.

4. The method of claim 3 wherein a portion of the deflocculent is removed prior to forming.

5. The method of claim 3 wherein a portion of the monomer is removed by electrophoresis.

6. The method of claim 3 wherein a portion of the monomer is removed by filter pressing.

7. The method of claim 2 wherein the exposed surface of the slip is covered by a second carrier surface.

8. The method of claim 2 wherein the slip is formed between two carrier surfaces.

9. The method of claim 2 wherein the monomer comprises an ester of an unsaturated carboxylic acid.

10. The method of claim 2 wherein the monomer comprises an anhydride of an unsaturated carboxylic acid.

11. The method of claim 9 or claim 10 wherein the unsaturated carboxylic acid is selected from the group consisting of acrylic acid, methacrylic acid, fumaric acid, itaconic acid and citraconic acid.

12. The method of claim 9 or claim 10 wherein the deflocculent comprises fish oil.

13. The method of claim 9 or claim 10 wherein the deflocculent comprises a nonionic surfactant selected from the group consisting of ethylene oxide condensates of alcohols, phenols, amines, amides and carboxylic acids.

14. The method of claim 9 or claim 10 wherein the deflocculent comprises a quaternary ammonium compound.

15. The method of claim 9 or claim 10 wherein the deflocculent comprises a carboxylic acid selected from the group consisting of oleic acid, stearic acid, caprylic acid and methacrylic acid.

16. The method of claim 1 wherein the ceramic powder is alumina.

* * * * *